(12) United States Patent
Johansson

(10) Patent No.: US 11,311,948 B2
(45) Date of Patent: Apr. 26, 2022

(54) ROTARY DRILL TOOL WITH INSERT CENTRING SURFACES

(71) Applicant: SANDVIK INTELLECTUAL PROPERTY AB, Sandviken (SE)

(72) Inventor: Patrik Johansson, Kungsgarden (SE)

(73) Assignee: Sandvik Intellectual Property AB, Sandviken (SE)

( * ) Notice: Subject to any disclaimer, the term of this patent is extended or adjusted under 35 U.S.C. 154(b) by 163 days.

(21) Appl. No.: 16/629,836

(22) PCT Filed: Jul. 4, 2018

(86) PCT No.: PCT/EP2018/068029
§ 371 (c)(1),
(2) Date: Jan. 9, 2020

(87) PCT Pub. No.: WO2019/011734
PCT Pub. Date: Jan. 17, 2019

(65) Prior Publication Data
US 2021/0154748 A1 May 27, 2021

(30) Foreign Application Priority Data
Jul. 10, 2017 (EP) .................................... 17180492

(51) Int. Cl.
*B23B 51/02* (2006.01)
*B23B 51/00* (2006.01)

(52) U.S. Cl.
CPC .............. *B23B 51/02* (2013.01); *B23B 51/00* (2013.01); *B23B 2251/02* (2013.01); *B23B 2260/124* (2013.01)

(58) Field of Classification Search
CPC . B23B 51/00; B23B 2251/02; B23B 2251/04; B23B 51/02; B23B 2251/50; B23B 2260/124; B23C 2210/02; B23C 2200/361
See application file for complete search history.

(56) References Cited

U.S. PATENT DOCUMENTS

| | | | |
|---|---|---|---|
| 6,196,769 B1 | 3/2001 | Satran et al. | |
| 7,168,893 B2 * | 1/2007 | Takiguchi | B23B 51/0009 408/227 |
| 7,311,480 B2 | 12/2007 | Heule et al. | |
| 7,997,836 B2 * | 8/2011 | Kim | B23B 51/06 408/59 |
| 2005/0135888 A1 * | 6/2005 | Stokey | B23B 51/0009 408/230 |
| 2009/0162151 A1 * | 6/2009 | Sjoo | B23C 5/109 407/35 |

FOREIGN PATENT DOCUMENTS

| | | | |
|---|---|---|---|
| EP | 0172148 A2 | | 2/1986 |
| EP | 1454693 A2 | | 9/2004 |
| JP | 2004261931 A | * | 9/2004 |
| JP | 2006205290 A | * | 8/2006 |
| WO | 0202263 A1 | | 1/2002 |

* cited by examiner

*Primary Examiner* — Eric A. Gates
*Assistant Examiner* — Paul M Janeski
(74) *Attorney, Agent, or Firm* — Corinne R. Gorski

(57) ABSTRACT

A cutting insert for a rotary drill tool and a drill tool assembly in which an insert and a support body are coupled via cooperative contact surfaces and a mounting screw. The contact surfaces provide a dual function to axially and rotationally lock the insert at the support body in addition to providing a centring function of the insert.

17 Claims, 9 Drawing Sheets

ROTARY DRILL TOOL WITH INSERT CENTRING SURFACES

RELATED APPLICATION DATA

This application is a § 371 National Stage Application of PCT International Application No. PCT/EP2018/068029 filed Jul. 4, 2018 claiming priority to EP 17180492.5 filed on Jul. 10, 2017.

FIELD OF INVENTION

The present invention relates to a rotary drill tool insert and to a drill tool assembly in which the insert is mountable to a support body so as to maximise retention of the insert and provide a tight and stable fit.

BACKGROUND ART

Multi-component drilling tool assemblies have been developed in which an insert formed from a hard expensive material (such as a cemented carbide, ceramic or the like) is releasably axially and radially locked at a tool or carrier body formed from a lower hardness and less expensive material. The insert is typically regarded as a wear part and is provided with an axially forward facing cutting region that typically includes a series of cutting edges and cutting surfaces.

Control and management of the transmission of axial loading forces and torque from the insert to the drill body is required to securely mount the insert during use whilst enabling insert replacement once worn. Tine-type locking interfaces have been developed in an attempt to appropriately transfer such loading forces.

U.S. Pat. No. 7,311,480 discloses a multi-component drill tool in which an insert of a relatively hard material is releasably mounted at an axially forward jaw of a support body formed from a less hard and lower grade material via a mounting screw. Centring fins extend radially outward from an otherwise 'spade' shaped insert to facilitate centring of the insert. Clamping of the insert within the jaw via the radially bridging mounting screw is facilitated by a slot that extends axially rearward from the jaw to allow opposing jaw members to flex radially in response to tightening of the screw in mounted position.

However, existing drill tool assemblies of the aforementioned type are susceptible to premature failure and exhibit what is regarded as a generally short operational lifetime due to stress and fatigue at the support body resultant from the significant loading forces transmitted between the insert and support body. In particular, the mounting surfaces and components are required to withstand significant axial and radial loading forces in addition to torque forces with such forces changing dynamically and suddenly during cutting/drilling. Accordingly, what is required is a drill tool that addresses these problems.

SUMMARY OF THE INVENTION

It is a general objective of the present invention to provide a drill tool insert and a drill tool assembly to control and manage transmission of loading forces between the insert and a support body so as to provide a stable fit and appropriately centre and retain the insert in mounted position.

It is a specific objective to provide an insert and an assembly that minimises or eliminates regions (or sites) for the nucleation of stress concentrations that may otherwise lead to crack propagation and/or fatigue induced deformation of the insert and/or the support body. It is a further specific objective to provide an assembly and in particular an insert having appropriate interfaces that are capable of withstanding radial forces during use independently of the direction and magnitude by which the forces are applied so as to achieving a centralising of the insert at the support body relative to a longitudinal axis extending through the drill tool.

The objectives are achieved via an insert and a drill tool assembly in which the insert and the support body each comprise respective corner regions having contact surfaces that are adapted to transmit radial loading forces between the insert and support body in addition to being adapted to maximise the centred positional locking of the insert at the support body. The secure centring of the insert is advantageous to provide a robust and reliable multicomponent drill tool assembly exhibiting high resistance to imparted torque and axial and radial loading forces.

According to a first aspect of the present invention there is provided a cutting insert for a rotary drill tool extending along a longitudinal axis for cutting metal, the insert comprising:

an axially forward facing cutting region and an axially rearward facing mount region; at least two corner regions extending in an axial direction between the cutting region and the mount region, the corner regions defined by an intersection of a respective first and second contact surface aligned transverse or generally perpendicular to one another and configured for abutment with respective contact surfaces of a support body; a bore extending radially through the insert between the corner regions such that respective open ends of the bore are positioned at the intersections of the first and second contact surfaces at the corner regions, the bore configured to receive an attachment element to axially secure the insert at the support body; wherein at least a surface area portion of the first and second contact surfaces are positioned in an axial direction between the axial positions of the open ends of the bore and the axially forward facing cutting region.

The surface area portion of the first and second contact surfaces positioned axially between the open ends of the bore and the axially forward facing cutting region is advantageous to maximise a radial clamping leverage from the support body arms to the insert. In particular, this arrangement obviates the requirement for a slot or slit at the base region of the jaw of the support body as the axially endmost portions of the arms are suitably capable of deforming radially inward into clamping engagement with the insert.

Preferably, corner regions of the insert are adapted for mounting radially inside respective corner regions of retaining arms of the support body. Preferably, the radially inner corner regions of the insert in a plane perpendicular to the longitudinal access are adapted to seat within complementary shaped receiving corner regions of the retaining arms.

Preferably, in a plane perpendicular to the longitudinal axis, an angle by which the first and second contact surfaces extend relative to one another is in a range 88° to 130°, 88° to 120°, 88° to 110° or 88° to 100°, 90° to 130°, 90° to 120°, 90° to 110° or 90° to 100°. Such a configuration allows the forces applied by the attachment element to be distributed evenly between the first and second contact surfaces at each corner region. Additionally, this relative orientation of the first and second contact surfaces provides the desired transmission pathways of the radial forces transmitted between the insert and the arms of the support body resultant from disturbances/perturbations in the cutting process that may otherwise be transmitted through the attachment element and in turn causing the arms to be forced radially outward with the insert being loosened from its mounted position.

Preferably, in a plane perpendicular to the longitudinal axis an angle between an axis of the bore that extends radially through the insert and an orientation of the first or second contact surface is in a range 35° to 55° or 40° to 50°. This is advantageous to direct the transmission of the radial forces between the insert and the support body and to reduce or eliminate such radial forces being directed into the attachment element that would otherwise reduce the locking action of the retaining arms.

Preferably, each open end of the bore is positioned to intersect both the first and second contact surfaces. Such a configuration provides the desired centring of the insert at the longitudinal axis whilst withstanding the asymmetrical radial loading forces encountered during cutting. Optionally, in a plane perpendicular to the longitudinal axis, a diameter of each open end of the bore extends over a part of a radial width of the first contact surface and extends over a complete radial width of the second contact surface.

Preferably, the first and second contact surfaces are planar. This arrangement facilitates manufacturing and contributes to an increase in the available manufacturing tolerances specifically at the corner regions of the insert and the support body whilst achieving the desired transmission pathway of loading forces and centring of the insert at its mounted position.

Preferably, the insert comprises two diametrically opposed lobes and two diametrically opposed wings extending radially outward from the axis in a direction transverse or generally perpendicular to the lobes, the first contact surfaces provided at each respective lobe and the second contact surfaces provided at each respective wing. Preferably, the wings extend radially outward from the axis by a distance being less than a corresponding distance by which the lobes extend radially outward. In particular, a separation from the longitudinal axis of the perimeter envelope surfaces (positioned at each lobe) is greater than a corresponding separation in a radial direction of a radially outer wing side surface.

The relative difference in a radial extension of each lobe and each respective wing maximises the locking and centring of the insert by providing the desired respective surface areas of the first and second contact surfaces. Such a configuration is effective to withstand torque transmitted from the support body to the insert during use whilst achieving the centring function.

Preferably, in a plane perpendicular to the longitudinal axis the contact surfaces at each corner region are generally perpendicular to one another (i.e. 88 to 92°).

According to a second aspect of the present invention there is provided a rotary drill tool for cutting metal comprising: an insert as claimed herein; a support body extending along a longitudinal axis and terminated at an axially forward end by at least two axially projecting arms spaced apart about the axis so as to define between them a jaw, the insert releasably mountable within the jaw; wherein each arm comprises a radially inner engaging corner region defined by an intersection of a corresponding first and second contact surface aligned transverse or generally perpendicular to one another, the corner regions of the insert being configured for abutment or mated abutment with the respective corner regions of the support body; and wherein each arm has a radially extending coaxial bore, the coaxial bores of the arms and the bore of the insert configured to generally align and receive an elongate attachment element locatable to force the arms radially inward against the insert to axially retain the insert at the support body.

Preferably, contact between the contact surfaces of the insert and the arms occurs at an axial position axially forward of the attachment element. More preferably, contact between the contact surfaces of the insert and the arms occurs generally exclusively axially forward of the attachment element. As indicated, such an arrangement provides for maximised radial clamping leverage from the support body arms to the insert.

Accordingly, as the attachment element (mounting screw) is tightened in position the contact pressure between the respective contact surfaces of the arms and insert is maximised.

Preferably, at least some surfaces of the lobes in part define an axially forward region of axially extending chip flutes of the support body. The present insert and support body facilitate chip evacuation at the cutting region without compromising service lifetime and centring of the insert at the support body.

Preferably, the tool further comprises a screw locatable within the bores of the arms and the insert to retain the insert at the support body.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
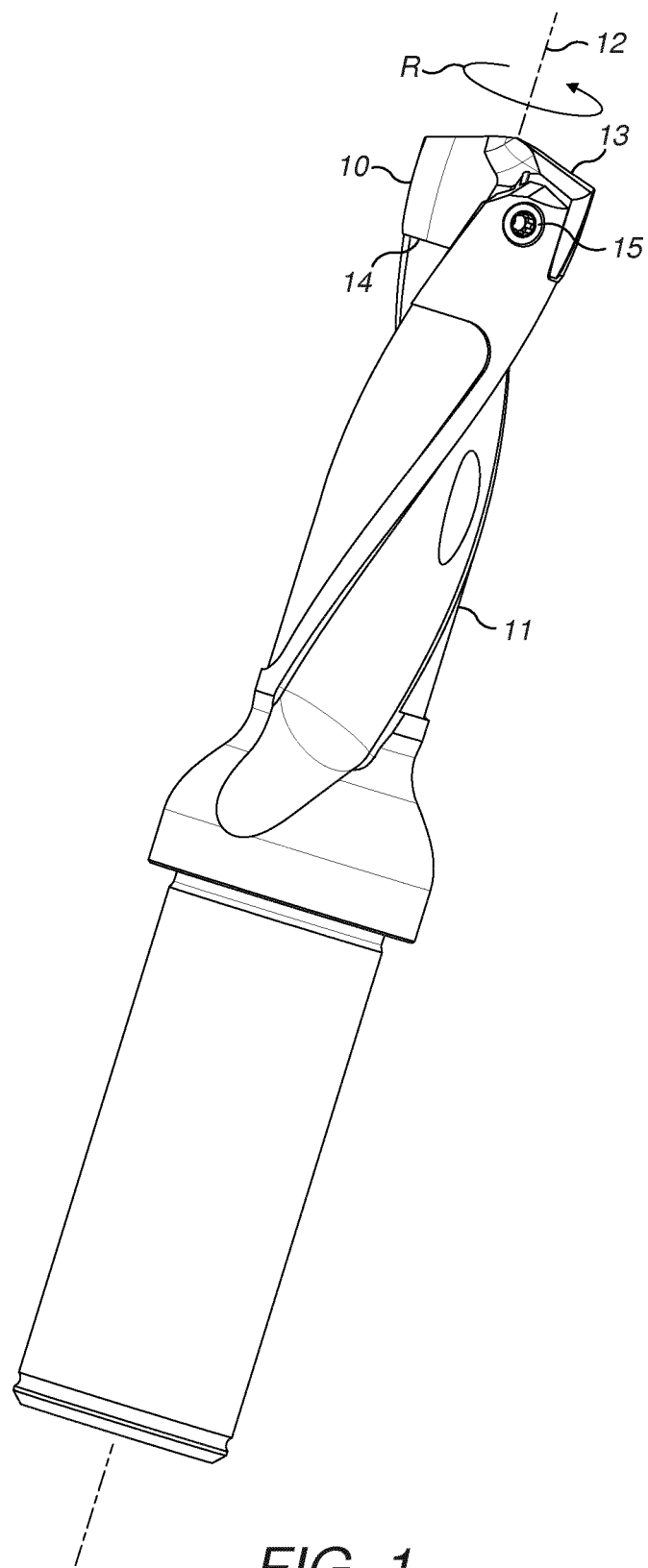
FIG. 1 is a perspective view of a drill tool having an elongate support body releasably mounting at one axial end a cutting insert according to a specific implementation of the present invention.

Referring to FIG. 1, a cutting tool implemented as a drill tool comprises an elongate support body 11 extending along a central longitudinal axis 12. A cutting insert 10 is releasably mounted at an axial forward end of the support body 11. Insert 10 comprises an axially forward facing cutting region 13 and an axially rearward mount region 14 received within an axial forward end of support body 11.

Mount region 14 and the axially forward end of support body 11 are shaped complementary to one another both axially and radially as described in detail below so as to provide control and management of the transmission of loading forces between insert 10 and support body 11 during use. A mounting screw 15 extends radially through the axial forward end of support body 11 and insert 10 so as to axially and rotationally lock insert 10 to support body 11.

Figure 2:
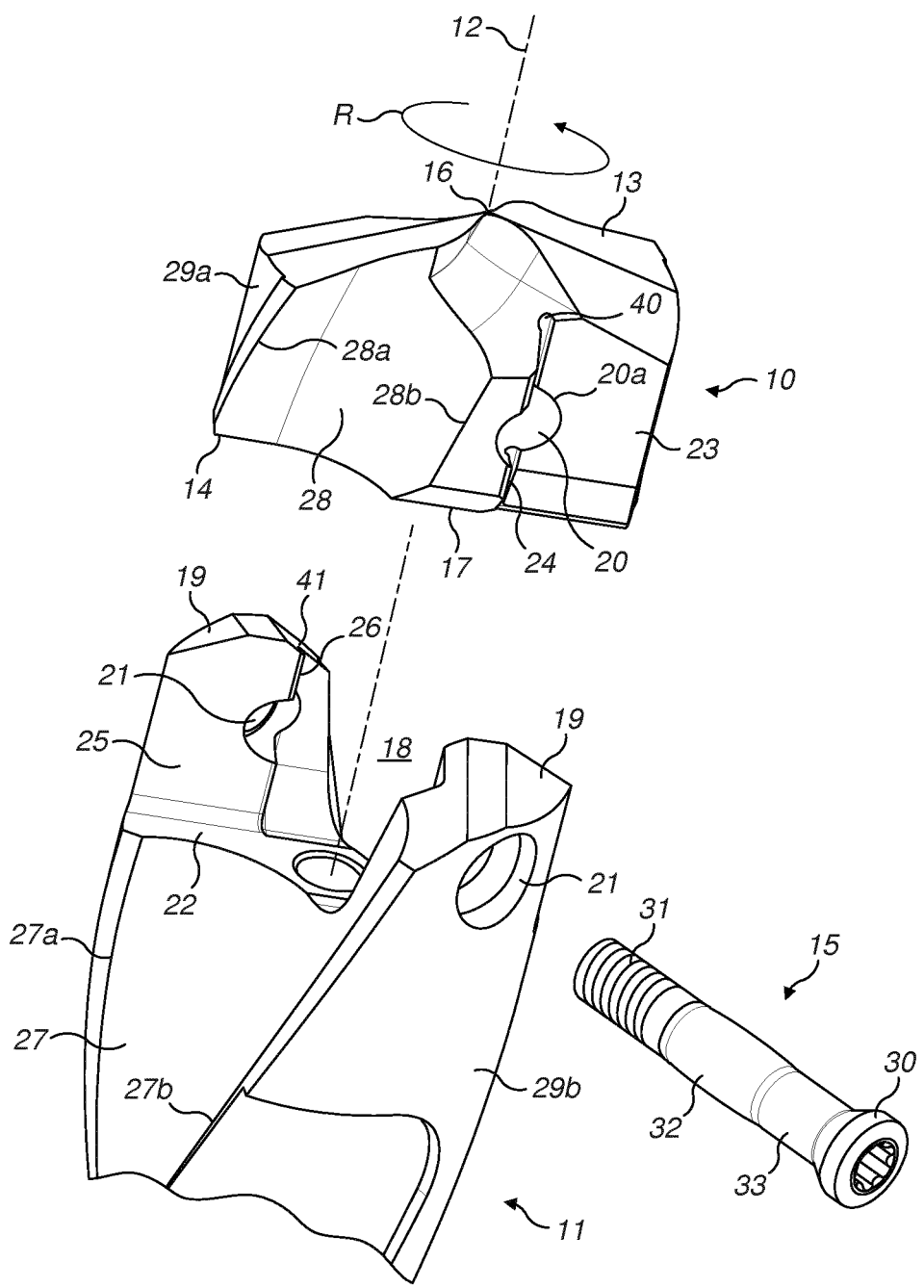
FIG. 2 is an exploded magnified view of the drill tool assembly of FIG. 1 in which the insert is axially and rotationally locked to the support body via a mounting screw according to the specific implementation.
Figure 6:
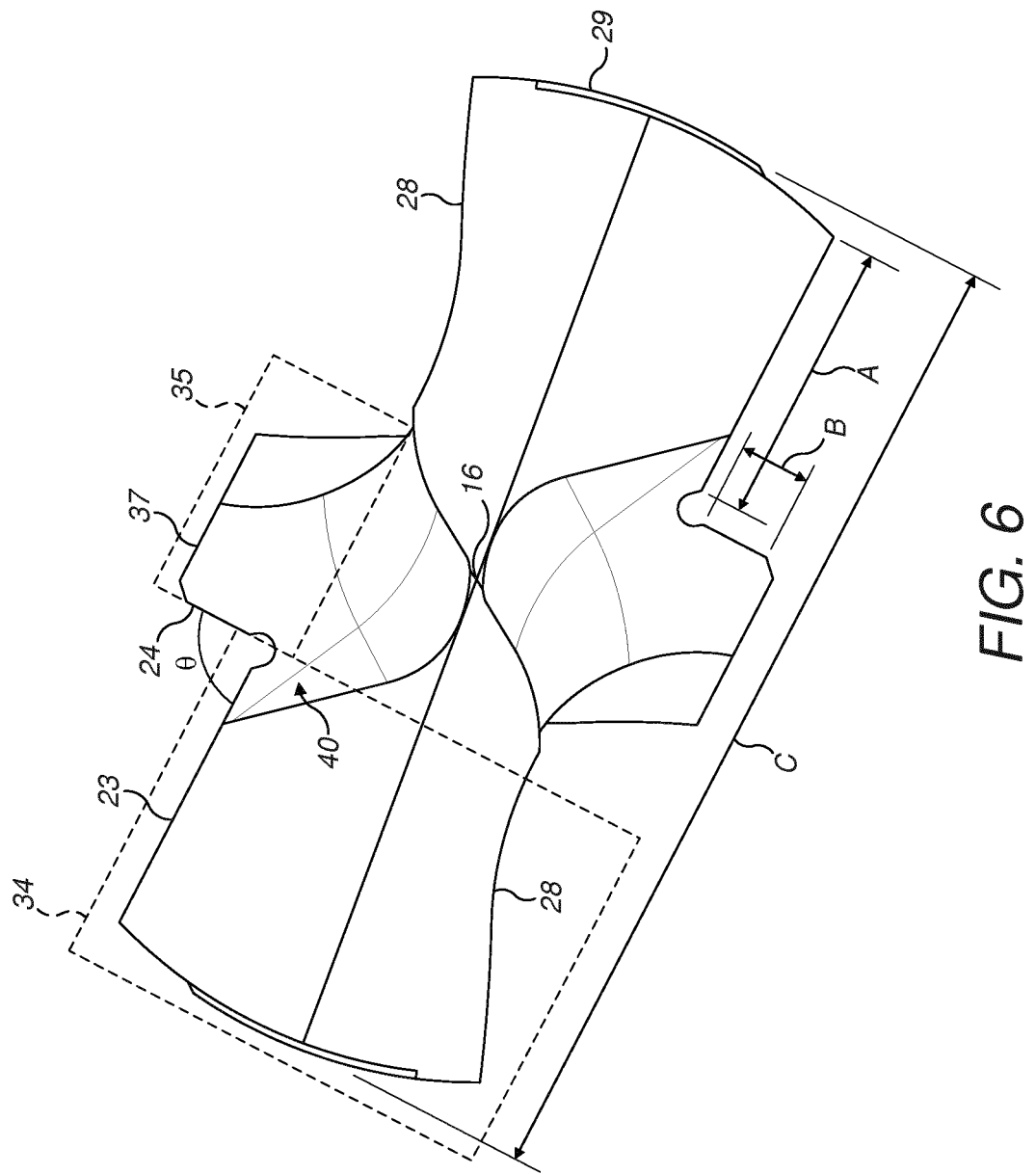
FIG. 6 is a plan view of the insert of FIG. 2.

Referring to FIGS. 2 and 6, insert 10 comprises what may be regarded a general 'spade' configuration in which a length extending in a radial direction is greater than a corresponding perpendicular width. Insert 10 comprises an axially rearward facing base surface 17 at an opposite axial end relative to the forward facing cutting region 13. Region 13 comprises regions that are at least partially conical in which a cutting tip 16 is centred at longitudinal axis 12 that also extends through insert 10. A radially outer perimeter of insert 10 is defined by part cylindrical envelope surfaces 29a positioned at each lengthwise end of insert 10. The lengthwise sides of insert 10 are defined, in part, by a generally planar first contact surface 23 and a generally curved concave surface 28. A body segment of insert 10 defined between the opposed surfaces 23, 28 (at each lengthwise side) may be considered a lobe 34 representing respective first and second lengthwise end regions (in the radial direction) of insert 10. Insert 10 further comprises a pair of diametrically opposed wings 35 that project laterally outward from a central region of insert 10 in a direction perpendicular to each first contact surface 23. Each wing 35 is in part defined by a planar second contact surface 24 (aligned perpendicular to first contact surface 23) a side surface 37 and a portion of curved concave surface 28. Accordingly, insert 10 comprises a pair of lengthwise extending diametrically opposed lobes 34 and a pair of lateral or widthwise extending diametrically opposed wings 35 so as to define a body having a '+' shape profile in a plane perpendicular to axis 12. As detailed further below, a length of each lobe 34 is greater than a corresponding width of wings 35. In particular, insert 10 in the plane perpendicular to axis 12, comprises a length (between envelope surfaces 29a) being greater than a corresponding width (between wing side surfaces 37).

Accordingly, insert 10 comprise a height in the axial direction extending between cutting region 13 and base surface 17 being defined in part by surfaces 23, 24, 28, 29a and 37. The concave surface 28 is terminated and in part defined by axially extending edges 28a, 28b that form a junction with envelope surface 29a and wing side surface 37, respectively. A bore 20 extends radially through insert 10 such that an axial length of bore 20 bisects axis 12. Bore 20 comprises respective axial end openings 20a that are located at the first and second contact surfaces 23, 24 such that the effective surface area of each respective contact surface 23, 24 is reduced. Bore 20 is positioned in the axial direction such that a significant surface area of the first and second contact surfaces 23, 24 (in the axial direction) extend axially forward of at least part of the bore 20 so as to be positioned between bore 20 and the axially forward cutting region 13.

Referring to FIG. 2, the axial forward end of support body 11 that mounts insert 10 is formed as a tooth-like fitting comprising a pair of retaining arms 19 spaced apart diametrically about axis 12 so as to define between them a jaw 18. Each arm 19 comprises a bore 21 extending radially between an outward facing envelope surface 29b and a radially inner region of each arm 19. In particular, the radially inner regions of each arm 19 are defined by a corresponding planar first contact surface 25 and a perpendicular aligned planar second contact surface 26. Support body 11 may be considered to comprise two axially extending members that are twisted about axis 12 and separated by concave surfaces 27 that define axially extending helical chip flutes. Each surface 27 is defined, in part and is bordered by axially extending first and second edges 27a, 27b. With insert 10 mounted in position at support body 11, the respective curved concave surfaces 28, 27 are configured to align such that the chip flutes extend axially along support body 11 and insert 10 so as to terminate at an axially forwardmost region of the tool corresponding to the forward facing cutting region 13.

Jaw 18 is further defined by a base surface 22 that extends radially between arms 19 and is configured for positioning opposed to insert base surface 17. As illustrated, surfaces 17 and 22 are aligned perpendicular to the respective first 23, 25 and second 24, 26 contact surfaces.

Figure 3:
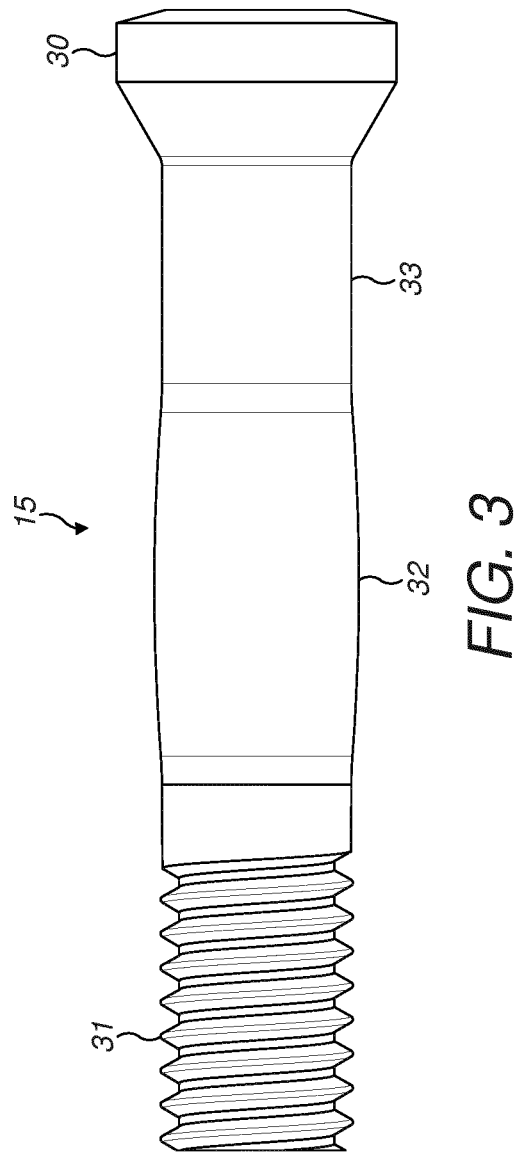
FIG. 3 is a lengthwise side view of the mounting screw of FIG. 2.
Figure 4:
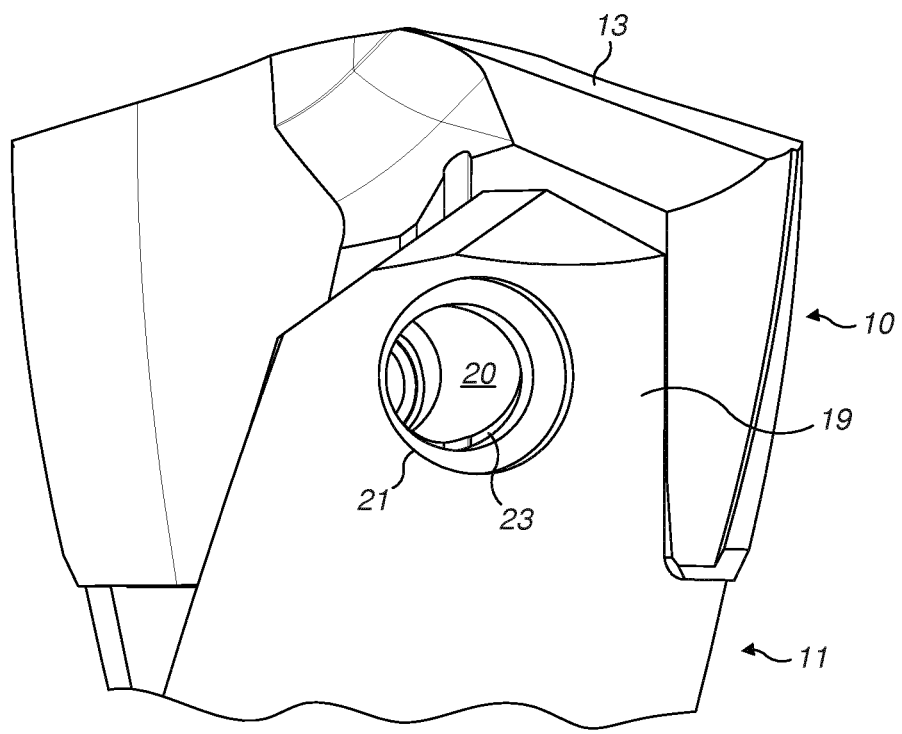
FIG. 4 is a side perspective view of the forward cutting end of the drill tool assembly of FIG. 1 with the screw removed for illustrative purposes.

Referring to FIGS. 2 and 3, mounting screw 15 is generally elongate and comprises an enlarged head 30 positioned at one axial end of a shaft. The screw shaft is divided axially into at least three regions including a first end region 33 extending from head 30, a central portion 32 and an opposite second end region 31. First region 33 is generally cylindrical and second region 31 comprises external threads so as to cooperate with corresponding threads formed internally within one of the arm bores 21. As such, the bore 21 of the opposite arm 19 is radially enlarged so as to accommodate head 30. Shaft central portion 32 is generally barrel shaped so as to have an increasing diameter relative to the respective end regions 33, 31. Referring to FIG. 4, with insert 10 mounted at jaw 18 between arms 19, the insert 10 and the support body 11 are configured such that an axial centre of insert bore 20 is positioned axially forward (in the direction of axis 12) relative to the corresponding axial centres extending radially through arm bores 21. Accordingly, with insert 10 mounted in position at the jaw 18 but without the screw mounted in position at bores 20 and 21, a lip is presented at the radially inner part of arm bores 21 corresponding to a small surface area of the first and contact surfaces 23, 24. Such an arrangement is advantageous in that, as the screw 15 is inserted through the generally aligned bores 20 and 21, the radially enlarged screw central portion 32 contacts insert bore 20 and by cooperative abutment with arm bores 21, it forces insert 10 axially rearward into full mated contact between the arms 19 and within the jaw 18. Accordingly, in such a configuration, mounting screw 15 is pre-tensioned axially so as to provide an axially rearward directed biased force to insert 10.

Figure 5:
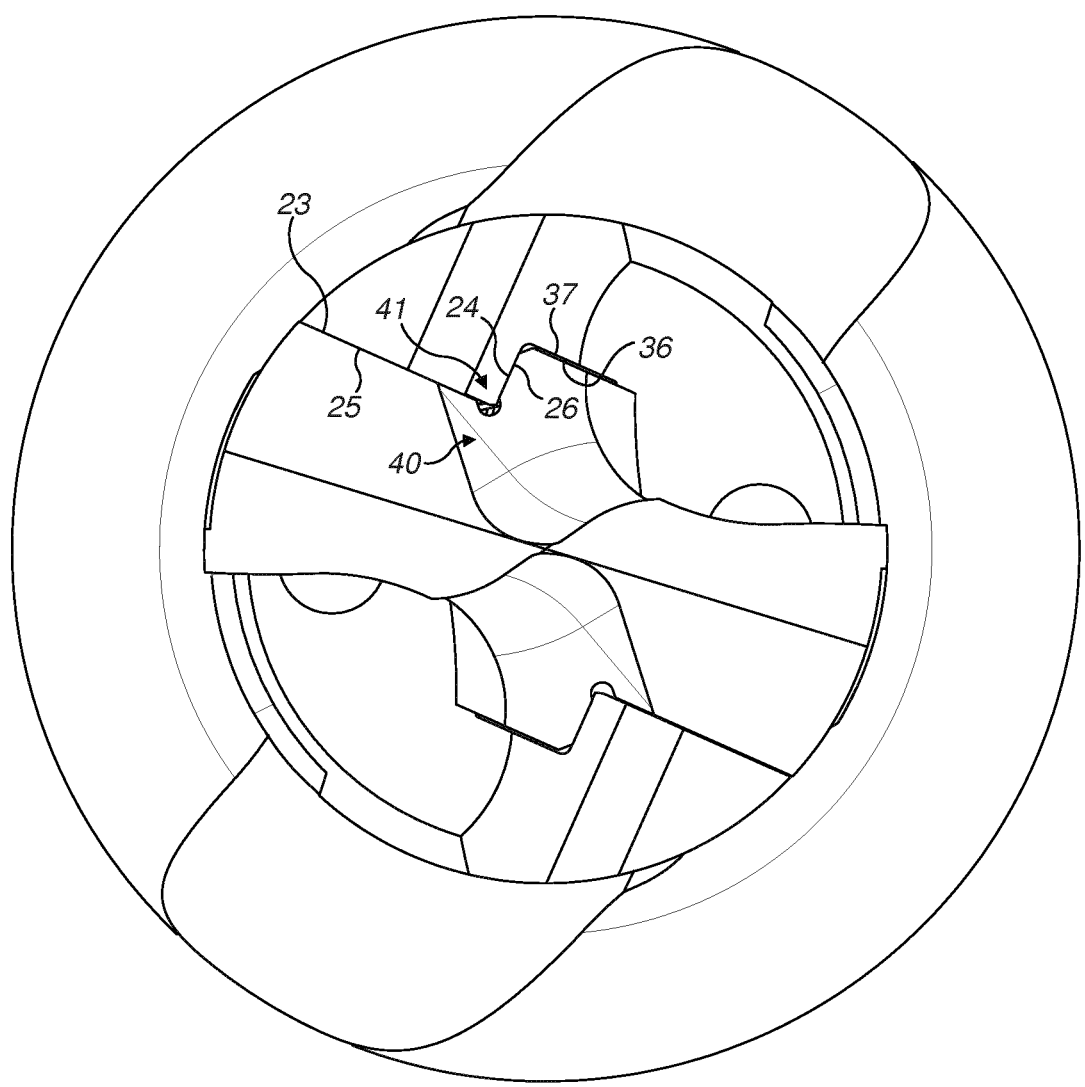
FIG. 5 is an axial end view of the cutting assembly of FIG. 1 at the cutting end.

Referring to FIGS. 5 and 6, the junction between the first and second contact surfaces 23, 24, at each lengthwise side of the insert 10, may be regarded a corner region 40. The radially inner portions of arms 19 formed by the junction between the corresponding first and second contact surfaces 25, 26 may similarly be regarded as a corner regions 41. Each insert corner region 40 is adapted to receive a respective corner region 41 of support body 11 with the opposed first contact surfaces 23, 25 and the opposed second contact surfaces 24, 26 positioned in respective touching contact. Such a configuration provides a desired centring of the insert 10 at the support body 11 configured to withstand both radial forces and torque forces encountered during use. According to the specific implementation, a desired or sufficient centring is achieved via the contact between the respective first and second contact surfaces 23, 25, 24, 26 such that a small clearance is provided between wing side surface 37 and a corresponding radially inward facing surface 36 at each arm 19.

Referring to FIG. 6, in a plane perpendicular to axis 12, an angle θ between the first and second contact surfaces 23, 24 is in a range 90 to 110°. Such a configuration is advantageous to provide the desired centring and avoid any lateral shifting of the insert 10 between the arms 19 due to radial forces and torque. According to the specific implementation, first contact surface 23 comprises a width A (in the plane perpendicular to axis 12) being greater than a corresponding width B of second contact surface 24. According to the specific implementation, the quotient of B/A is in a range 0.2 to 0.3. In the plane perpendicular to axis 12, insert 10 comprises a maximum length C such that a quotient A/C is 0.22 to 0.34.

Figure 7:
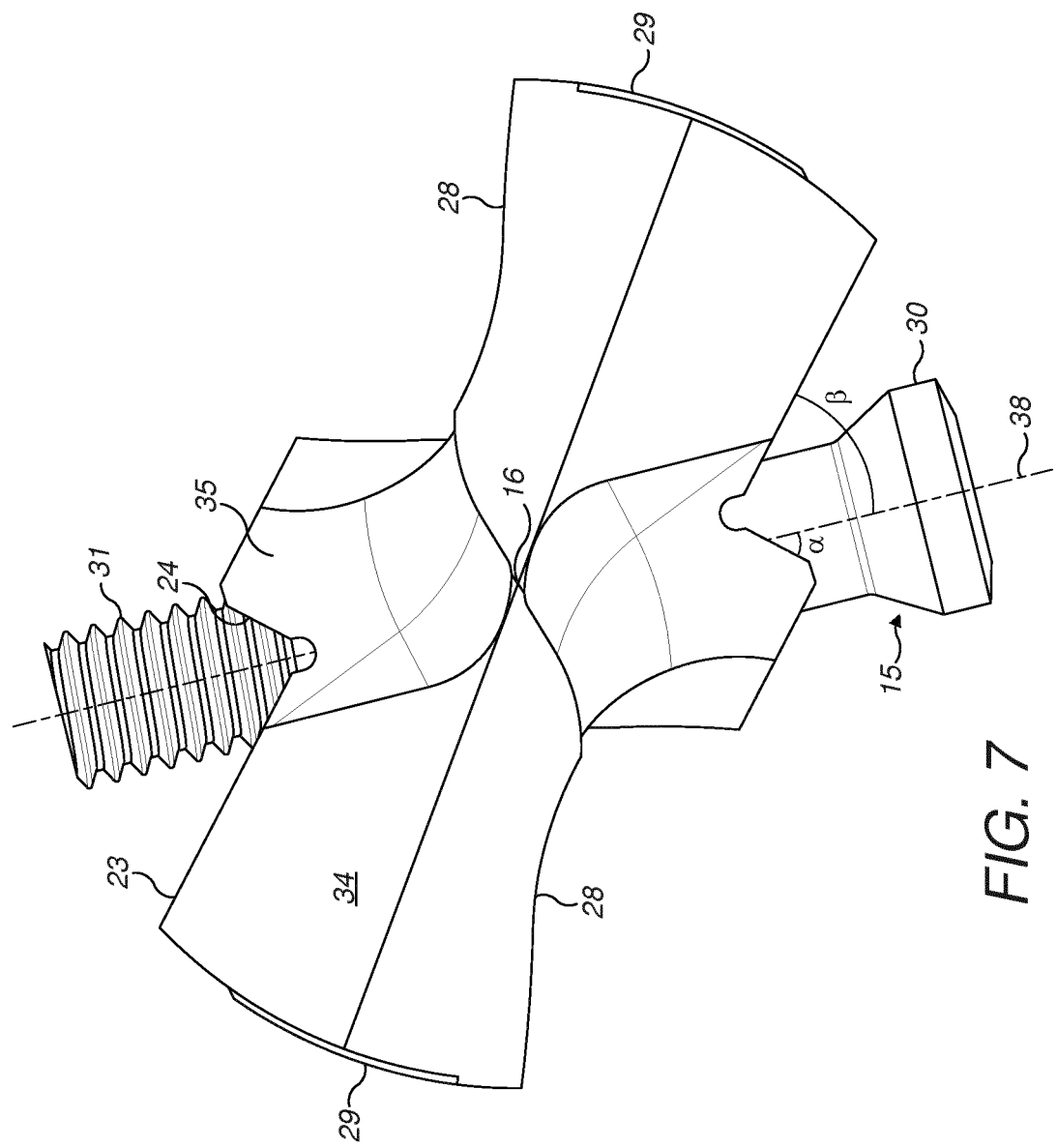
FIG. 7 is a plan view of the insert of FIG. 6 with the mounting screw inserted to extend through the insert.

Referring to FIG. 7, and in the plane perpendicular to axis 12, an axis 38 of mounting screw 15 is aligned transverse to first contact surface 23 at an angle β and transverse to second contact surface 24 at an angle α. According to the specific implementation, β is in a range 35 to 55° and is in particular 40 to 50°. Such a configuration is advantageous to achieve the desired centring function via cooperation between screw 15 and the respective contact surfaces 23, 24, 25 and 26. As illustrated in FIG. 5, the relative dimensions and alignment of the respective first and second contact surfaces 25, 26 of each arm 19 is identical, nearly identical or at least very similar to those of insert contact surfaces 23, 24 with regard to the stated dimensions A, B, C and angles θ, α and β.

Figure 8:
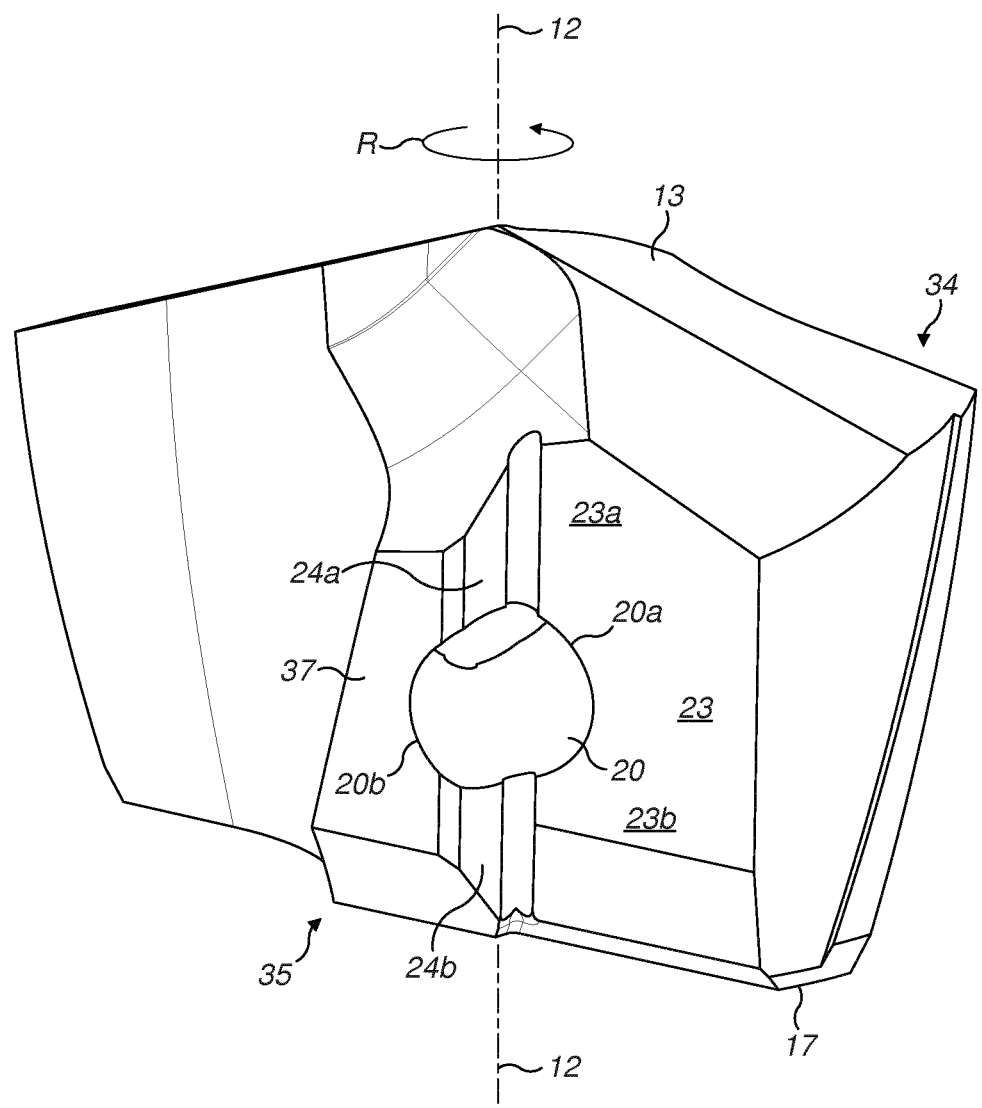
FIG. 8 is a side perspective view of the insert of FIG. 6.
Figure 9:
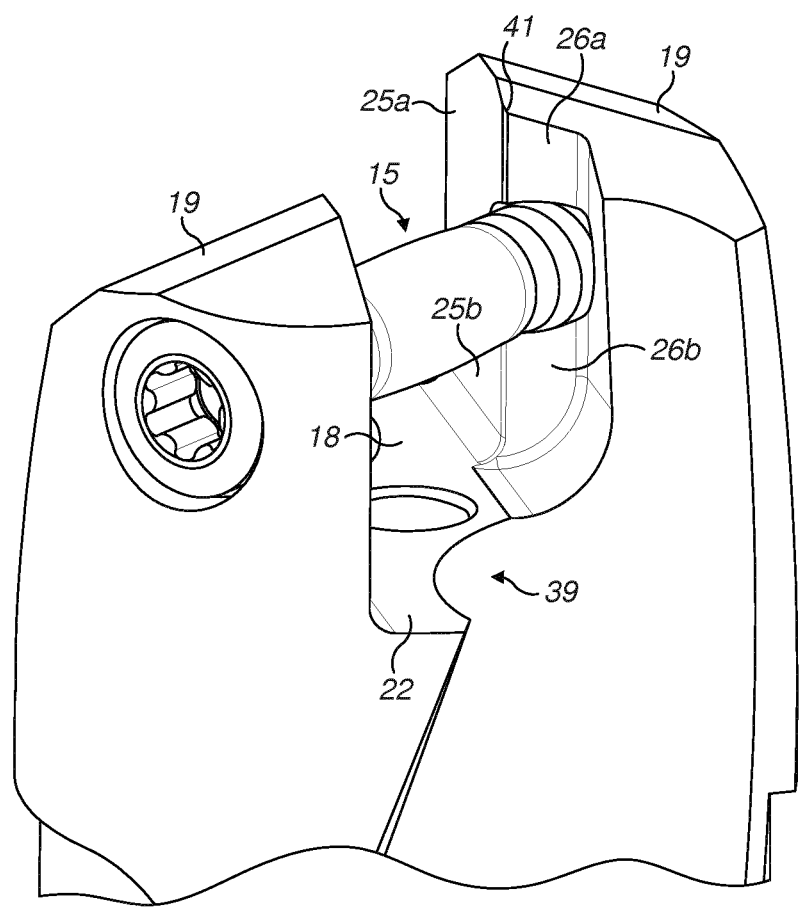
FIG. 9 is a perspective view of the forward axial cutting end of the drill tool assembly of FIG. 1 with the insert removed for illustrative purposes.

Referring to FIGS. 8 and 9 insert bore 20 intersect each of the first and second contact surfaces 23, 24 at a mid-height position. Accordingly, a first surface area portions 23a and 24a are positioned axially between bore 20 and forward facing cutting region 13. Additionally, a second surface area portions 23b and 24b are positioned axially rearward between bore 20 and base surface 17. Similarly, each of the first and second contact surfaces 25, 26 of each arm 19 may be considered to be divided in the axial direction by the respective bores 21 so as to provide axially forward first surface are portions 26a, 25a and corresponding axially rearward second surface area portions 26b, 25b. Such a configuration is advantageous in that as mounting screw 15 is tightened in position to bridge arms 19 (with the insert 10 located within jaw 18) the axially forward first surface area portions 23a, 24a, 25a and 26a are configured to abut one another as the arms 19 are drawn radially inward towards axis 12. Contact between the arms 19 and insert 10 at the axially forwardmost region of arms 19 is beneficial to maximise the clamping affect provided by screw 15 as the radial displacement of the axially forward first surface area portions 25a, 25b is significantly greater than the corresponding second axially rearward surface portions 26a, 26b. The magnitude of the clamping force with which support body 11 frictionally retains insert 10 at jaw 18 is accordingly maximised. The present configuration of the respective contact surfaces 23, 24, 25, 26 is advantageous to achieve the corresponding centring of the insert 10 at the support body 11 without negatively affecting the locking action provided by surface area portions 25a, 26a. Additionally, due to the location and hence the available radial movement of surface area portions 25a, 26b a region 39 axially rearward of jaw base surface 22 may be devoid of a slit or slot that would otherwise be required in order to provide the desired radial flex of the arms 19 when screw 15 is secured in position. Accordingly, the axially forward region of support body 11 being devoid of an axially extending slot is advantageous to eliminate undesirable stress concentrations at the region of the jaw 18 that may otherwise result in crack propagation and in turn failure of the cutting assembly. The present assembly therefore is provided with an enhanced service lifetime and a significantly reduced likelihood of premature separation of insert 10 from support body 11.

The invention claimed is:

1. A cutting insert for a rotary drill tool for cutting metal comprising:
    an axially forward facing cutting region and an axially rearward facing mount region;
    at least two corner regions extending in an axial direction between the cutting region and the mount region, the corner regions being defined by an intersection of a respective first and second contact surface aligned transverse or generally perpendicular to one another and configured for abutment with respective contact surfaces of a support body; and
    a bore extending radially through the insert between the corner regions such that respective open ends of the bore are positioned at the intersections of the first and second contact surfaces at the corner regions, the bore being configured to receive an attachment element to axially secure the insert at the support body, wherein at least a surface area portion of the first and second contact surfaces is positioned in an axial direction between the axial positions of the open ends of the bore and the axially forward facing cutting region.

2. The insert as claimed in claim 1, wherein in a plane perpendicular to the longitudinal axis, an angle by which the first and second contact surfaces extend relative to one another is in a range of 88° to 130°.

3. The insert as claimed in claim 2, wherein said range is 88° to 120°.

4. The insert as claimed in claim 2, wherein said range is 90° to 100°.

5. The insert as claimed in claim 1, wherein in a plane perpendicular to the longitudinal axis an angle between an axis of the bore that extends radially through the insert and an orientation of the first or second contact surface is in a range of 35° to 55°.

6. The insert as claimed in claim 5, wherein said range is 40° to 50°.

7. The insert as claimed in claim 1, wherein each open end of the bore is positioned to intersect both the first and second contact surfaces.

8. The insert as claimed in claim 7, wherein in a plane perpendicular to the longitudinal axis, a diameter of each open end of the bore extends over a part of a radial width of the first contact surface and extends over a complete radial width of the second contact surface.

9. The insert as claimed in claim 1, wherein the first and second contact surfaces are planar.

10. The insert as claimed in claim 1, further comprising two diametrically opposed lobes and two diametrically opposed wings extending radially outward from the axis in a direction transverse or generally perpendicular to the lobes, the first contact surfaces being provided at each respective lobe and the second contact surfaces being provided at each respective wing.

11. The insert as claimed in claim 1, wherein in a plane perpendicular to the longitudinal axis the contact surfaces at each corner region are generally perpendicular to one another.

12. A rotary drill tool for cutting metal comprising:
    an insert as claimed in claim 1; and
    a support body extending along a longitudinal axis and being terminated at an axially forward end by at least two axially projecting arms spaced apart about the axis so as to define between them a jaw, the insert being releasably mountable within the jaw, wherein each arm includes a radially inner engaging corner region defined by an intersection of a corresponding first and second contact surface aligned transverse or generally perpendicular to one another, the corner regions of the insert being configured for abutment with the respective corner regions of the support body, and wherein each arm has a radially extending coaxial bore, the coaxial bores of the arms and the bore of the insert being configured to generally align and receive an elongate attachment element locatable to force the arms radially inward against the insert to axially retain the insert at the support body.

13. The tool as claimed in claim 12, wherein contact between the contact surfaces of the insert and the arms occurs at an axial position axially forward of the attachment element.

14. The tool as claimed in claim 13, wherein contact between the contact surfaces of the insert and the arms occurs generally exclusively axially forward of the attachment element.

15. The tool as claimed in claim 12, wherein said contact surfaces of the insert and the arms are generally planar.

16. The tool as claimed in claim 12, wherein the insert includes two diametrically opposed lobes, at least some surfaces of the lobes in part defining an axially forward region of axially extending chip flutes of the support body.

17. The tool as claimed in claim 12, wherein the attachment element is a screw locatable within the coaxial bores of the arms and the insert to retain the insert at the support body.

* * * * *